United States Patent [19]
Julich

[11] Patent Number: 5,980,125
[45] Date of Patent: Nov. 9, 1999

[54] FOCUSING METHOD AND FRAME FOR LARGE-FORMAT CAMERAS

[76] Inventor: Harry Julich, 6807 Winter La., Annandale, Va. 22003

[21] Appl. No.: 09/102,275

[22] Filed: Jun. 22, 1998

Related U.S. Application Data

[60] Division of application No. 08/969,768, Nov. 21, 1997, Pat. No. 5,843,604, which is a continuation-in-part of application No. 08/487,302, Jun. 7, 1995, Pat. No. 5,725,979.

[51] Int. Cl.$^6$ .................................................. G03B 17/26
[52] U.S. Cl. ............................................................. 396/526
[58] Field of Search ..................................... 396/440, 441, 396/511, 517, 150, 151, 526; 352/221, 225, 227; 355/44, 55, 59, 61, 73

[56] References Cited

U.S. PATENT DOCUMENTS

| | | | |
|---|---|---|---|
| 2,450,841 | 10/1948 | Moore | 396/526 |
| 2,497,270 | 2/1950 | Panosian | 396/526 |
| 2,552,905 | 5/1951 | Panosian | 396/525 |
| 2,604,831 | 7/1952 | Fraenckel | 396/441 |
| 3,740,138 | 6/1973 | Blatherwick | 355/73 |
| 3,782,947 | 1/1974 | Krall | 430/21 |
| 3,993,488 | 11/1976 | Oishi | 396/518 |
| 4,188,115 | 2/1980 | Marvin | 355/75 |
| 4,279,945 | 7/1981 | Audran et al. | 427/130 |
| 4,341,855 | 7/1982 | Morrison et al. | 430/140 |
| 4,977,424 | 12/1990 | Mukai et al. | 396/150 |
| 5,105,216 | 4/1992 | Kondo et al. | 355/44 |
| 5,254,449 | 10/1993 | James et al. | 430/533 |
| 5,368,995 | 11/1994 | Christian et al. | 430/530 |

*Primary Examiner*—D. Rutledge
*Attorney, Agent, or Firm*—Bacon & Thomas

[57] ABSTRACT

This invention relates to large, ie view-cameras and supplants the fixed conventional viewing screen by using instead a focusing frame partly or totally geometrically congruent with the sheetfilm holder for such a camera, said frame being temporarily inserted into this camera for focusing, the conventional sheetfilm-holder partition being replaced in the focusing frame of the invention by a transparent viewing screen of which the focusing surface faces the lens. In this manner the invention achieves coincidence, within a desired and optionally zero tolerance, of film emulsion plane and focusing surface and eliminates the errors related to uncertain positioning of the conventional viewing screen of a large-format camera.

10 Claims, 10 Drawing Sheets

FIG. 1a.3
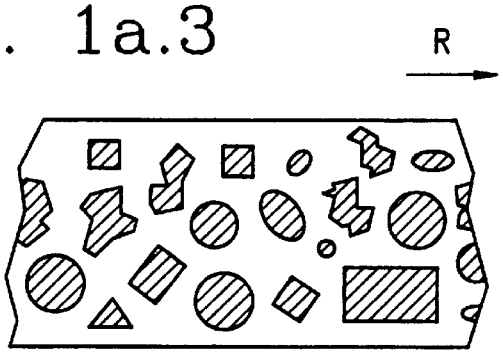
FIG. 1a.4
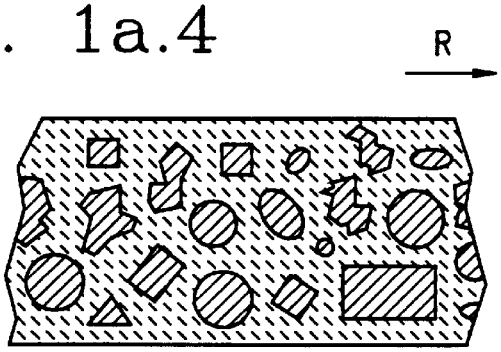
FIG. 1a.5
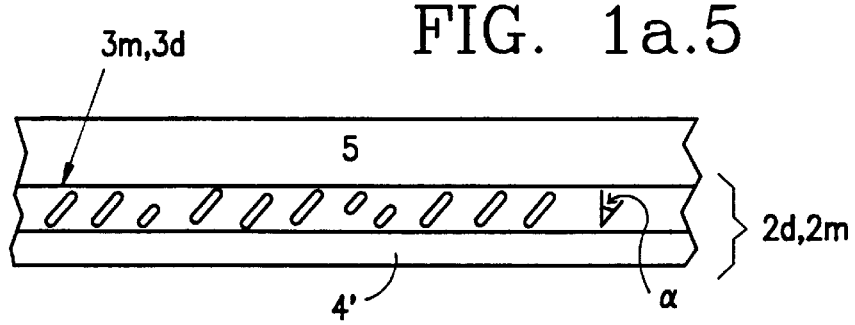
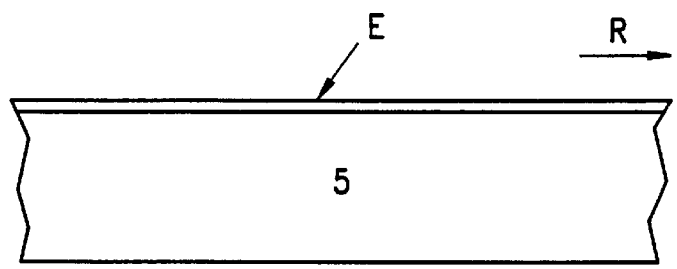
FIG. 1a.6

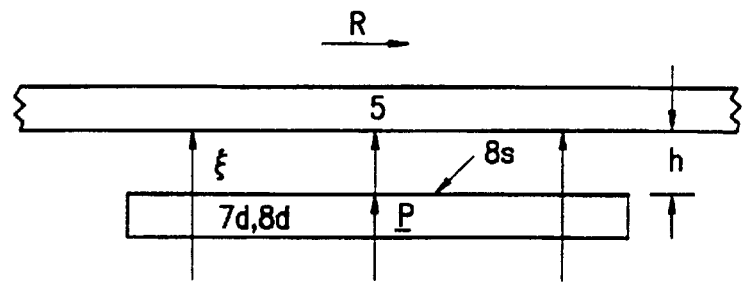
FIG. 2a
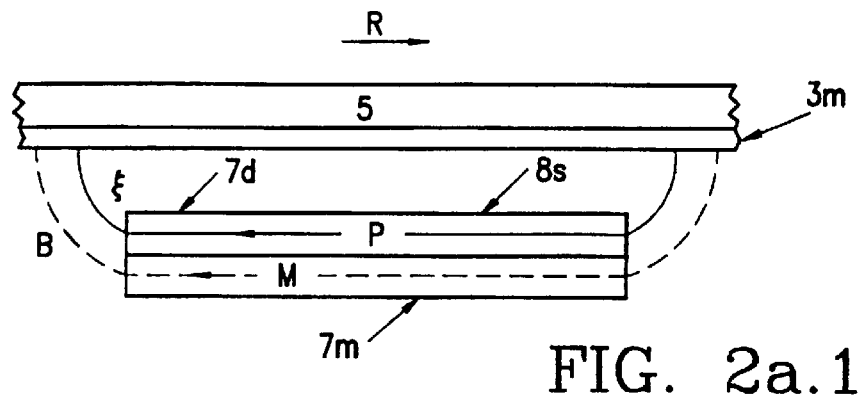
FIG. 2a.1
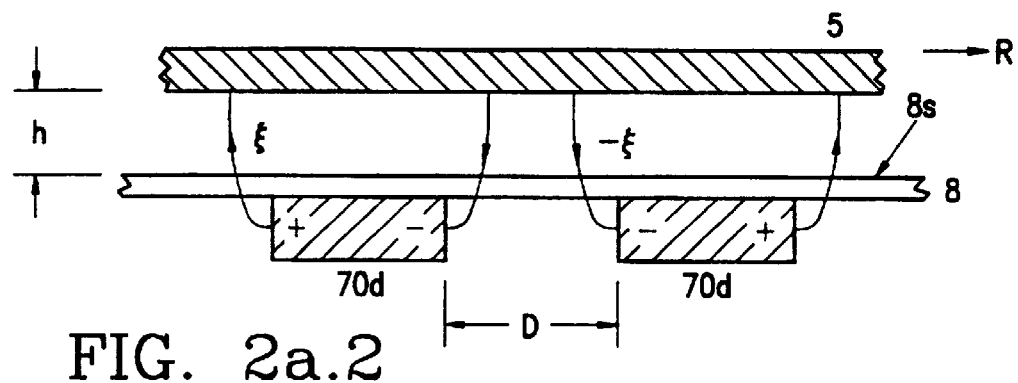
FIG. 2a.2
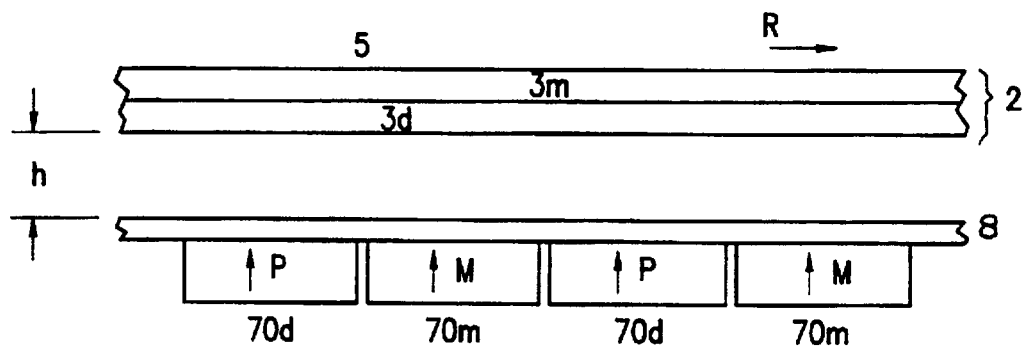
FIG. 2a.3

FIG. 4a.1

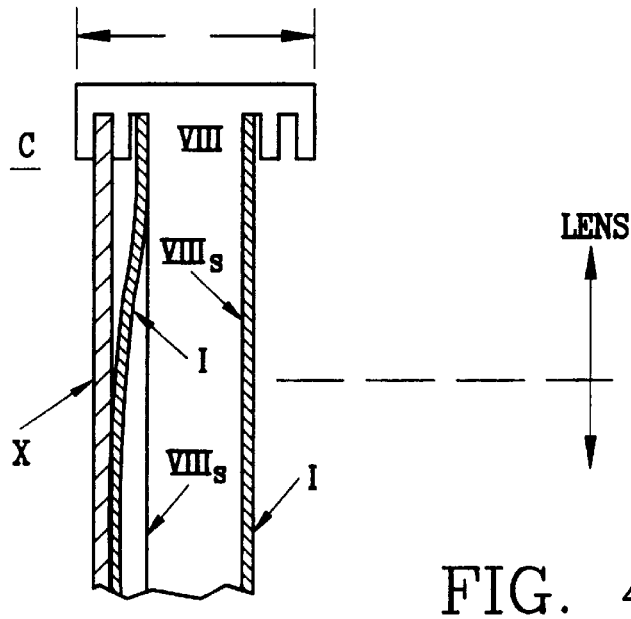
FIG. 4a.2
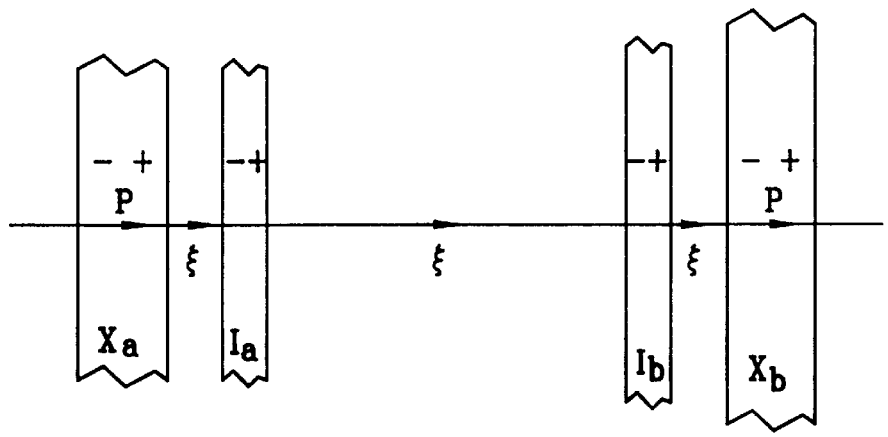
FIG. 4a.3
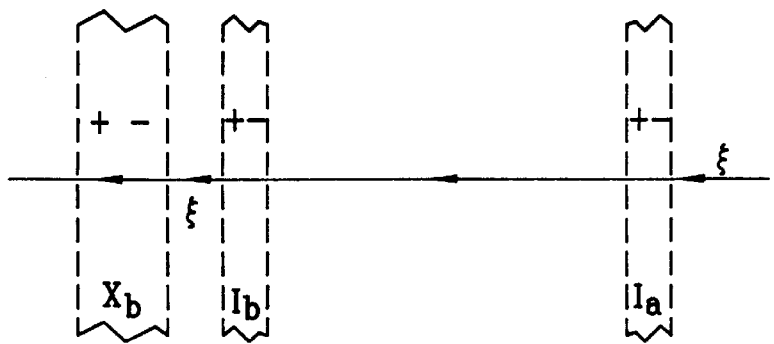
FIG. 4a.4

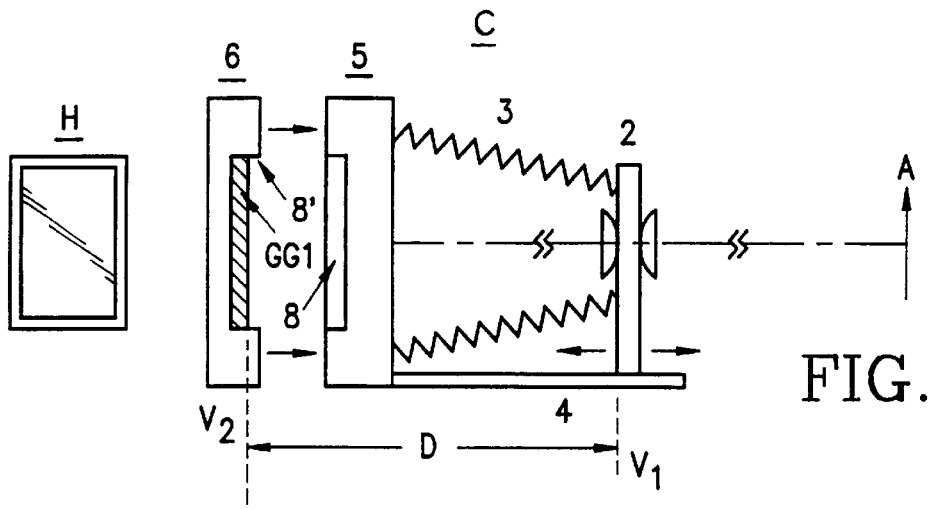
FIG. 5
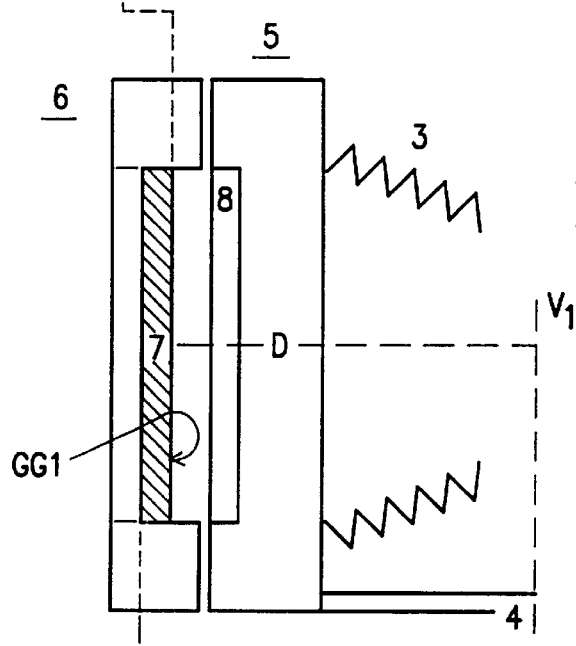
FIG. 5a.1
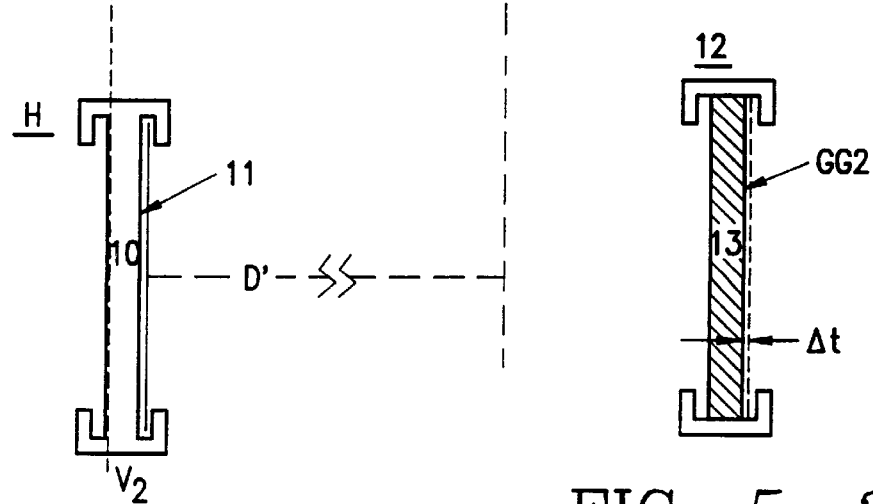
FIG. 5a.2

FOCUSING METHOD AND FRAME FOR LARGE-FORMAT CAMERAS

This application is a division of U.S. patent application Ser. No. 08/969,768 filed Nov. 21, 1997, U.S. Pat. No. 5,843,604, which is a CIP of U.S. patent application Ser. No. 08/487,302 filed Jun. 7, 1995, now U.S. Pat. No. 5,725,979.

BACKGROUND OF THE INVENTION

1. Field of the Invention

This invention relates to the field of photography, and in particular to a method and apparatus for sharpening camera-recorded pictures. In a first implementation of the invention, said method and apparatus relate to flattening the film against a reference surface such as the surface of rollfilm pressure-plate or a sheetfilm-holder partition substantially more rigorously than is the case in conventional cameras, and furthermore to a novel focusing screen for view, i.e. large-format, cameras replacing the conventional screen and its conventional accessories and allowing focusing with heretofore unavailable reliability. In a second implementation of the invention, said method and apparatus relate to improved focusing of view cameras.

It will be understood by those skilled in the art that the word "photography" is intended to encompass any application in which an optical image is captured by a light sensitive medium or "film."

2. Description of Related Art

One serious but much neglected problem encountered in photography is that warping of the film will cause the film to deviate from the image plane, and make it impossible to achieve optimal image sharpness. No matter how accurate the optical components of the image capture device or "camera," an ideally geometrically sharp image is, in practice, impossible to obtain using conventional equipment due to warpage of the film and consequently separation of the film from the pressure plate (or sheetfilm holder partition), conventionally provided as film-plane reference-surface means, will take place.

Once normal focusing of the film has been carried out in a camera only conventionally fitted with a pressure plate or sheetfilm-holder partition, the film warp is typically of sufficient magnitude to be the critical parameter in determining image sharpness. The problem is most acute for medium format films such as 120/220 films, but it also significantly affects 35 mm and large-film formats, and it affects all conventional cameras regardless of price.

Aside the intrinsic film warp, the 120 film format in particular is subject to further film detachment due to the sandwiched paper backing used in this format and which during picture taking will be sandwiched between the film support holding the emulsion at its top and the pressure plate or partition. Moreover, even if the paper backing were removed, and palliation achieved to that extent, the bare film still would excessively detach per se from the pressure plate and would still preclude uniform, sharp focusing.

Attempts have been made to address the problem of rollfilm or sheetfilm detachment by providing pneumatic suction devices that will pull the film against the film reference-surface means. Such suction devices, however, are inherently bulky, cumbersome and thereby unsuitable for use, both outdoors and indoors, except in exceedingly circumscribed conditions.

Other attempts to flatten the film in the camera have resorted to compressing the film between a glass plate and the pressure plate. Such configurations however entail the substantive drawbacks of inserting into the imaging path another optical element which, being in contact with the emulsion, moreover will inherently soil quickly. Such "solutions" have long been abandoned.

Consequently, aside from a few unsatisfactory attempts at remedy, the problem of film detachment has as a rule been ignored. Currently, there do not appear to be any significant efforts to address the problem, as evidenced for example by the fact that the text Image Clarity by John B. Williams, 224 pp, Focal Press, 1990, which deals solely with image sharpness, fails to address the problem of film detachment.

It is true that the state of the art already comprises photographic films with layers of magnetic material, and that one aspect of the present invention involves the use of a multilayer laminate affixed to a film (in cooperation with a force-field generating unit). However the mounting of a multilayer laminate on a photographic film as used in the present invention is clearly distinguishable from prior art proposals to provide photographic emulsions with layers of magnetic material spread across the emulsion. These magnetic layers of the films of the prior art are used for magnetic recording, for instance of sound, and would have been recognized by one of ordinary skill in the art as being unsuitable for use, in combination with a force-field generating apparatus, to flatten a photographic film in order to cause the image plane and the film to rigorously coincide and thereby improve the sharpness of the image: the magnetic material of the prior art is unsuitable for the purposes of the present invention because it is diaphanous and permanently in place, whereas the magnetic laminate of the invention is opaque and removed subsequent to exposure, and moreover the prior art arrangements degrade image quality both by light (i.e., the image) being scattered by the magnetic particles and by raising the fog level, whereas the present invention improves image quality without affecting fog levels. Publications disclosing such prior art combinations of film with magnetic layers include:

U.S. Pat. Nos. 2,604,831; 3,782,947; 3,993,488; 4,279,945; 4,341,855; 5,254,449; French patent 1,651,889; Canadian patent 686,172; Japanese patents 57-151,926; 4-214,544.

It may be worthwhile to observe that what may appear to be a potential alternative way to flatten a flexible film, i.e., increasing the tension on the film, while effective where much slack is present, is intrinsically and in practice unable to fully flatten the film and indeed must always fall very short of the goal of removing film warp as a limiting factor in achieving optimal image sharpness.

Considering the efforts and resources conventionally devoted to improving the quality of film and optical components, then by removing said film warp, the present invention shall provide significant benefits by making possible in economical and practical manner substantially higher image sharpness.

Another aspect of the invention relates to a novel focusing screen for "view", i.e. large-format cameras. Conventional view cameras typically comprise a lens connected in light-tight manner to a light-tight bellows itself connected in light tight-manner to a first rear frame that will receive the sheetfilm holder at least during picture taking. This first rear frame is fitted with a second rear frame, often called "back", which holds the focusing screen, usually with one ground glass surface or equivalent on which the lens image is reproduced and its sharpness used as a focusing gauge. This second frame can be pulled back enough from the first frame to allow inserting and holding the sheetfilm holder at least during image exposure.

This configuration assumes that the plane of the ground glass surface for which focusing was carried out also is the same plane occupied by the emulsion of the sheetfilm in the sheetfilm holder when inserted between said first and second frames, and moreover that once such a coincidence were or has been established, it would or shall hold into the future too. However to monitor such coincidence, special apparatus (autocollimators) are required, which are expensive, can be used practically only in a lab, in other words not by the photographer in the field.

Tests run by the inventor on a so-called 4×5 camera, the smallest of the view cameras, indicate that, for a "normal" or near-normal lens focussed at infinity, the discrepancy in distance between lens and film plane relative to perfect focus preferably shall be kept within 50 microns (1/20 mm) but that the coincidence of said emulsion plane and ground-glass surface is unlikely to be realized within such a narrow range in typical view cameras. This drawback is compounded by the image resolution of the ground-glass surface being too coarse to detect a focusing shift of some 50 microns.

The invention offers substantial palliations to remedy the just cited drawbacks of view cameras. It does so by bypassing the conventional focusing screen in said rear frame, this rear frame itself being also present in the invention to conventionally hold the conventional sheetfilm holder in place, and using instead of said conventional focusing screen an insertable focusing frame of the invention, outwardly similar to a conventional sheetfilm holder and also having a partition, however in the form of a viewing screen having a focusing surface, as the novel focusing screen. In this manner the photographer is equipped at all times with a highly reliable and very portable reference means allowing him to positively establish congruence between the focusing and the imaging planes without loss of time.

This first above basic design of the novel focusing screen of the invention can be further refined and such additional measures are elucidated further below.

SUMMARY OF THE INVENTION

It is accordingly a first objective of the invention to provide a method and an assembly and sub-assemblies for flattening a flexible photosensitive medium, hereinafter referred to as "film", at an image area during exposure, in order to make possible uniform focusing across the image plane and optimal image sharpness, without incurring the drawbacks of prior attempts at film flattening involving pneumatic suction devices or glass plates.

A second objective of the invention is to provide a view-camera focusing means speedily establishing congruence between a screen's focusing plane and the plane of the emulsion being exposed.

The said first objective of the invention is achieved by preferred embodiments of the invention which, in their broadest aspects, involve the use of a physical force field to cause the film to be attracted in the direction of a reference-surface means and thereby be flattened against the reference-surface of said means. This reference-surface means will be the rollfilm pressure plate or the view camera's sheetfilm holder partition, and the reference surface will be that side of the rollfilm-camera pressure plate which faces the film support, i.e. The emulsion substrate, or that side of the sheetfilm holder partition facing the lens. The physical force field in the various embodiments of the invention can be either magnetic or electrical, and either static (DC) or dynamic (AC).

Broadly speaking, "flatness" in this invention denotes at least such tight hugging of the reference surface by the film that the entailed theoretical degradation in image sharpness due any remnant warp detachment shall be preferably much less than the sum of the other irreducible, degrading factors of the camera system.

In accordance with narrower aspects of the first objective of the invention, a first and generally passive force-field responsive sub-assembly is temporarily affixed to an otherwise conventional rollfilm or sheetfilm and cooperates with the second, generally active sub-assembly comprising a force-field generating unit mounted in a rollfilm camera or in a sheetfilm-holder of a view camera. Herein the expression "sub-assembly" denotes substantially but not exclusively the particular functional means and also includes, where called for, accessories such as protective layers, bonding means and mounts.

In one particularly advantageous aspect of the first objective of the invention, the first, film-affixed sub-assembly may be a multilayer laminate with at least one layer responsive to the force field, and in particular it may be a multilayer laminate which includes a magnetic or dielectric layer and which may be peeled off the otherwise conventional film support before the film proper is processed.

In another preferred embodiment of the first objective of the invention, a multi-layer magnetic or dielectric layer is provided in the form of a soluble matrix containing a substantially uniformly distributed magnetic or dielectric powder so that, following exposure, the matrix can be removed by dissolution from the film proper, either before or during processing.

In yet another particularly advantageous aspect of the first objective of the invention, the force-field generating unit drawing the film against the film reference surface may incorporate the film reference-surface means and may be energized shortly before and, in order not to interfere with film advancement or emplacement, may be de-energized shortly after each individual picture-exposure.

In a variation of the above described embodiments of the first objective of the invention, for use with a paper-backed film, a force-field booster is provided to attract the paper-backed film. In another variation of the above-described embodiments, exchangeable rollfilm pressure-plates/field-generating-units are provided, and in yet another variation, AC force-fields of an appropriate frequency are employed.

In yet another variation of the above described embodiments, a control unit drives the force-field in relation to film advance and exposure.

A second object of the invention consists in using a focusing frame of the invention having an outer shape and outer dimensions generally congruent with the outer shape and outer dimensions of the conventional sheetfilm holder used in the view camera and containing a focusing screen approximately where the partition would be in a sheetfilm holder, said focusing frame being quickly insertably into and removable from the recess in the camera for the sheetfilm holder and functionally replacing the conventional, practically fixed viewing screen of a view camera while offering higher reliability of focusing.

For practicality, a particular sheetfilm holder of the invention containing said viewing screen of the invention should evince a fixed geometry even though sheetfilms of one format but of different properties will usually slightly differ in thickness. To take such slight differences in sheetfilm thickness into account, the invention proposes on one hand to select the thickness of the partition/viewing-screen such that it shall be the mean of the film thicknesses being used and on the other hand to select a partition/focusing-screen thickness which corresponds to a given sheetfilm thickness and to use vernier means to correct the focusing distance commensurately for sheetfilm-thicknesses.

Further details and variations of the first objective of the invention are elucidated below in relation to the drawings.

BRIEF DESCRIPTION OF THE DRAWINGS

All Figures are diagrammatic and where appropriate certain components therein are exaggerated in size for clarity of exposition.

FIGS. 1a.1 through 1a.4 are horizontal section; FIGS. 1a.5 and 1a.1 are vertical cross-sections.

FIGS. 2a.1, 2a.2 and 2a.3 are cross-sections of illustratively rollfilm force-field generating magnetic-units/pressure-plates representing as a rule second force-field generating sub-assemblies of the invention for cooperation with the films, i.e the first is force-field responsive sub-assemblies, shown in FIGS. 1, 1a, 1a.1 through 1d.

FIG. 5 symbolically shows a conventional view camera, FIG. 5a.1 shows an enlarged view of a conventional focusing system and sheetfilm holder, indicating the problem of the prior art, and FIG. 5a.2 is a schematic view of a focusing frame of the invention.

DETAILED DESCRIPTION OF THE PREFERRED EMBODIMENTS

In the description below of the first objective of the invention, even though they share common principles, rollfilm assemblies and sheetfilm assemblies are nevertheless described separately for greater clarity of exposition. The expression "rollfilm camera" in some instances also covers "view cameras" when the latter, in lieu of their conventional sheetfilm holders, are loaded with rollfilm adapters.

Where further below application of a rollfilm embodiment to a sheetfilm embodiment or vice-versa is obvious to one skilled in the art, needless repetition will be avoided by pointing out the said applicability to the other version at the appropriate place.

Figure 3A:
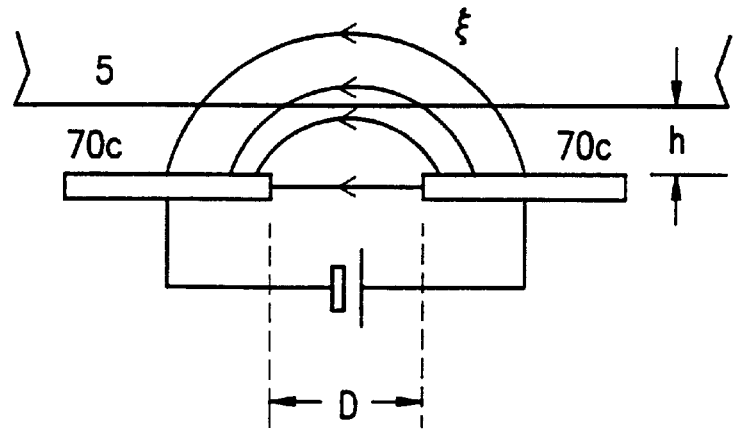
FIGS. 3a and 3a.1 show a preferred embodiment of the first objective of the invention in which a conventional film support is attracted using DC or AC electric fields.
Figure 3B:
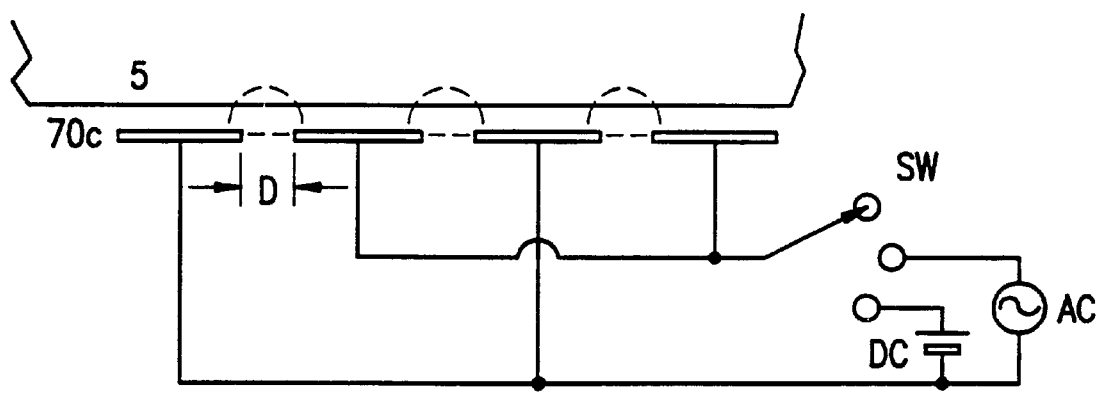
Figure 4:
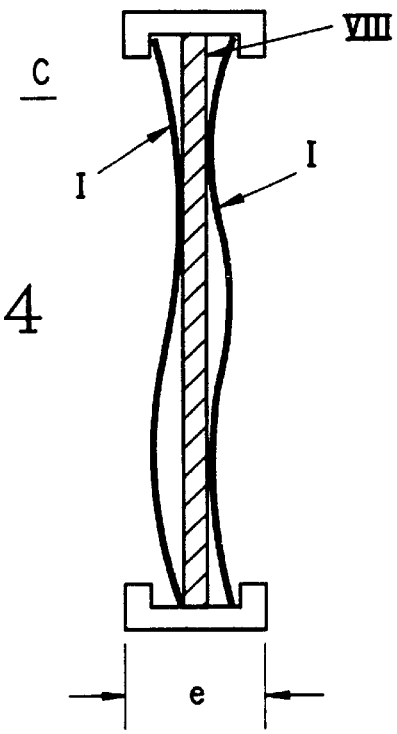
FIGS. 4, 4a, 4a.1, 4a.2, 4a.3 and 4a.4 are cross-sections of, respectively, a schematic conventional sheetfilm-holder and five modified sheetfilm holders according to preferred embodiments of the first objective of the invention.

Essentially FIGS. 1a through 3d relate to the rollfilm-camera assemblies and FIGS. 4 through 4d to the sheetfilm-camera assemblies. FIGS. 1, 5 through 8 may be applied to both.

In all cases the Figures below show certain components qualified by suffixes "m" and "d" or "M" and "D" depending on the embodiment or variation thereof. The suffix "m" denotes "magnetic", whether hard, soft or electromagnetic. The suffix "d" denotes "dielectric" (i.e., a material across which an electric field, including a DC field or a low-frequency AC field, can be induced) and may also relate to low-hysteresis dielectrics or to a ferroelectric material. In a special case, namely that of the parallel-plate capacitor, some suffixes are changed to "c" to denote electrical conductivity. The capitalized suffixes M, D refer to a functional interchange of the heretofore first, passive and second, active sub-assemblies, as will be explained below. The joint notation of the suffixes "m", "d" in the Figures indicates that the particular configuration denoted thereby is applicable substantially in both the "m" and "d" modes, even though for brevity only one mode may be discussed in relation to a particular Figure.

Unless and until specifically so noted, the discussed films are assumed free of paper-backing. Where paper-backing is present, such a configuration shall be explicitly so stated.

The following discussion of the many preferred embodiments of the invention is compartmentalized for the sake of overview, to the extent practical, into several subsets each with a salient feature. Broadly, such salient features for instance are rollfilm cameras or sheetfilm cameras, AC or DC operation, and various idiosyncratic variations.

A. Rollfilm-camera Assemblies

Figure 1:
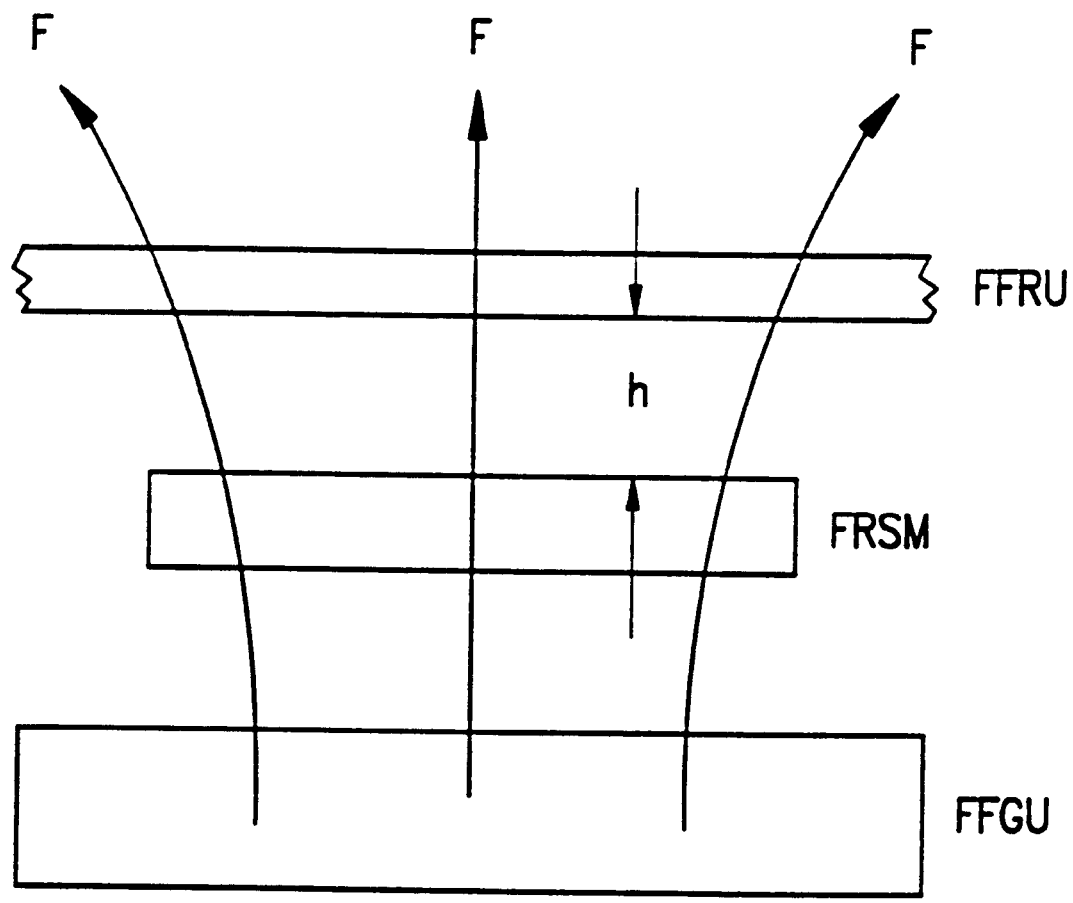
FIG. 1 is a schematic diagram illustrating the principles of a preferred embodiment of the first objective of the invention.

FIG. 1 is a block diagram of a first preferred embodiment of the invention composed of cooperating first and second sub-assemblies resp. denoted FFRU (force-field responsive unit) and FFGU (force field generating unit) positioned on opposite sides of a film reference surface means (FRSM). In this illustration, the first, generally passive force-field responsive sub-assembly, ie the FFRU, may be an otherwise conventional photographic film fitted with a force-field responsive laminate of the invention which is shown in the Figure above the film reference surface means by a height h symbolically denoting the film warp when in its unattracted state. Preferably the laminate of the invention remains affixed to the otherwise conventional film at least till the end of image exposure of the entire film, and in general until processing. Typically the laminate is removed, before or at the latest during processing, by being peeled off the conventional film or by being selectively dissolved.

The second, generally active sub-assembly FFGU comprises a force-field generating unit which generates an attractive field generically denoted by the field lines F.

Figure 1A:
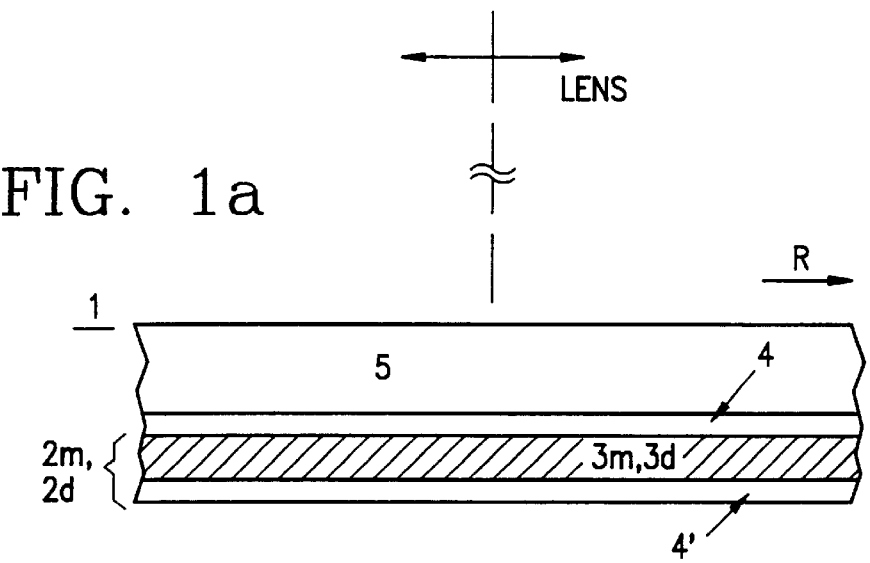
FIG. 1a is a vertical cross-section.
Figure 1A:
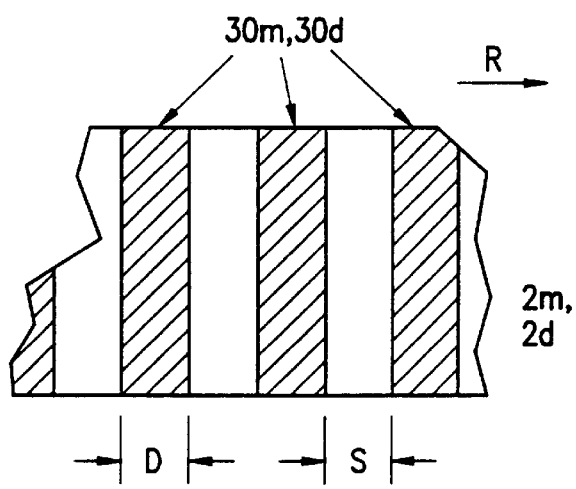
Figure 1A:
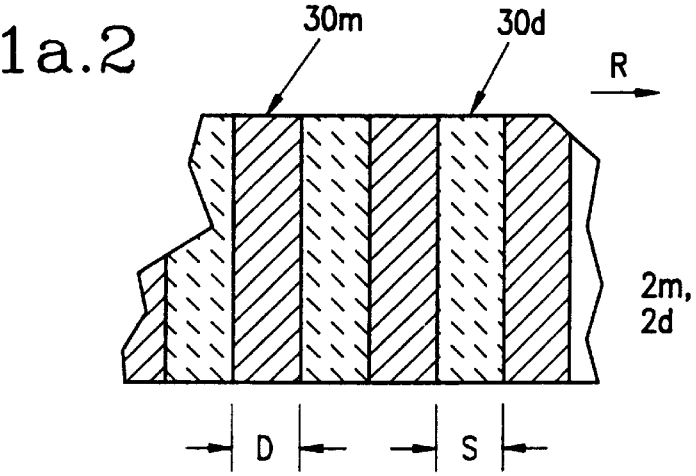

FIG. 1a symbolically shows a lens with its dashed-line optic axis perpendicular to a conventional photographic rollfilm 1. The suffixes m, d indicate that an embodiment is implementable in both magnetic and dielectric versions, even though only one (usually the magnetic one) is being discussed for the sake of brevity. Rollfilm 1 includes a support, i.e. an emulsion-substrate 5 and is fitted with a multi-layer magnetic laminate 2m constituting the first sub-assembly of the invention. R denotes the direction of film advance. Laminate 2m includes a magnetic force-field responsive layer 3m which responds to fields generated by permanent or electro magnets composing the second sub-assembly. Layer 3m is fitted on one side with a layer 4 detachably bonding the laminate 2m to the support 5 and on the other side with an optional layer 4'. In a variation of this embodiment, the layer 4 is both the bonding agent and the antihalation layer for the film.

Where used, the layer 4' of FIG. 1a protects the emulsion of the rollfilm when in its wound state (or the emulsion of the sheetfilm when in its stacked state). Preferably, layer 4' is a low-friction material such as Teflon™ to enhance smooth film-advance or emplacement. In the event the film 1 fitted with laminate 2m is furthermore backed with an unbonded paper backing, as is the case with 120 format film, this unbonded paper backing will be the layer 4'.

In order to permit conventional film processing, the multi-layer magnetic laminate 2m is removed after exposure, but before or no later than processing proper. The thickness of the multi-layer magnetic laminate 2m preferably is small compared to that of the conventional support 5 and, perforce, each constituent layer of the laminate 2m (except when 4' is paper backing) must be thin. The soft-magnetic layer 3m may consist either of a thin foil or of a powder.

FIG. 1a.1 is a top view of a modified multi-layer magnetic laminate 2m which in this instance also is assumed to be fitted with the above layers 4 and 4', with layer 4 being considered transparent for simplicity of discussion. Whereas in FIG. 1a the soft-magnetic foil is assumed continuous from at least the first rollfilm image frame to at least the very last, in this embodiment it is localized into recurring strips 30m running transversely to the direction of film advance R and of short length D in this direction of film advance, being mutually spaced apart by a distance S. In general several such strips and in-between gaps shall be present within the image frame. Magnetic material is saved thereby and the film 1, if a rollfilm, furthermore is rendered more pliant.

Whereas FIG. 1a.1 shows strips of magnetized/magnetizable material (30m) or of polarized/polarizable dielectric (30d), said strips being of width D and being separated by a gap S, FIG. 1a.2 shows such strips 30n, 30d alternating with one another and resp. of widths D and S.

Lastly, while not shown, other arrays of strips also may be used, for instance with the strips 30m and/or 30d running longitudinally instead of transversely or running obliquely at a selected angle relative to the direction of film advance R. Nor need the strips 20m, 30d of FIG. 1a.2 be tightly adjoining, instead they may be separated by narrow lengths of a material relatively inert compared with the materials of the strips 30m, 30.

FIG. 1a.3 is a topview of a magnetic/dielectric laminate of the invention and shows another distribution of the force-field responsive material, this new distribution again providing material economy. In practice, each element may be a figure of plane geometry, for instance a polygon, or figures of analytical geometry such as ellipses or parabolas, hyperbolas etc. In another variation, the elements may be random shapes randomly arrayed, provided that they are always near enough to one another, and the film rigid enough, that the energization-inert gaps between said elements cannot buckle, and thus are flattened as much as the energized zones. These elements of regular and irregular geometric shapes also may be intermingled. All said elements may be spaced apart by gaps selected to be random (shown) or to evince some desired regularity, for instance in rows and columns (not shown).

In FIG. 1a.3 the force-field responsive elements as shown indicate they are responsive to magnetism and imbedded in an inert material. However, as shown in FIG. 1a.4, these magnetically responsive elements also may be imbedded in a dielectrically responsive material as indicated by the dashed lines. while not shown, it is furthermore clear to the expert that the reverse cases may apply, namely that in FIG. 1a.3 the elements are dielectrically responsive while being embedded in a comparatively dielectrically inert material, and that in FIG. 1a.4 the dielectric elements are imbedded in a magnetically responsive material. Such simultaneous presence of elements responding to either field would offer the advantage of the film being attracted by a force-field generating unit of either kind.

The elements shown in FIGS. 1a.3 and 1a.4 were assumed substantially lamellar and their large surfaces running parallel to the plane of the conventional film. There may however be cases when such elements are desired to subtend an angle by their large surfaces to the direction of advance R, ie. To the plane of the film support 5, as illustrated in FIG. 1a.5. Provided the elements be short enough the angle $|\alpha|$ large enough, these elements may assume any orientation. Moreover, the elements need not be markedly lamellar, and in such a case, the largest cross-section of such elements may be made to subtend a selected angle $|\alpha|$ to the plane of the conventional film support 5.

Moreover said force-field responsive elements need not be all oriented similarly, instead they may also be oriented randomly.

In the limit, said elements also may be granules and/or near spherical particles.

It is noted that while embodiments such as the ones illustrated in FIGS. 1a.1 through 1a.5 save magnetic/dielectric material, they also entail tradeoffs, in particular with respect to decreased attraction, which are advantageously optimized empirically. In tests run by the inventor, conventional film, if held down at two spots 1 cm apart, is rigid enough not to detach in-between.

The force-field responsive sub-assembly described above, namely a laminate such as shown in FIGS. 1a through 1a.5, also may comprise more than 1, namely n force-field responsive layers $3m' \ldots 3m^n$, $3d' \ldots 3d^n$ with n=1, 2. . . . Accordingly the embodiment of FIG. 1 is a special case with n=1. The case for n=2 is illustrated in FIG. 1b.

In some embodiments of the invention, the sub-assembly of the invention in the form of the force-field responsive unit is eliminated and is replaced, if only for the dielectric case, by the support (itself a dielectric) of the unaltered conventional film. FIG. 1a.6 symbolically shows a conventional film with a direction of advance R, a support 5 and an emulsion E at the top of this support.

Figure 1B:
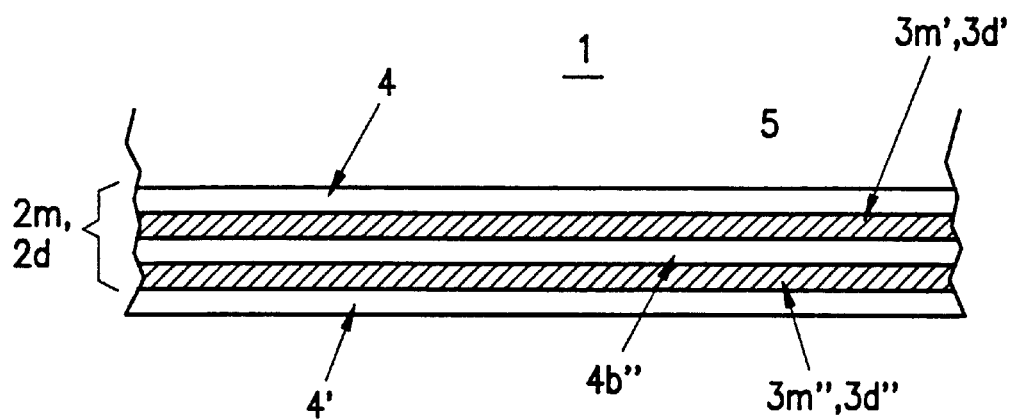
FIGS. 1b and 1c are vertical cross-sections of a film which includes magnetic or dielectric multilayer laminates representing as a rule first force-field responsive sub-assemblies of the invention constructed according to the principles of preferred embodiments of the first objective of the invention.

In FIG. 1b, the laminate, still denoted by 2m, 2d, regardless of the value of n, and with the bonding layer 4 of FIG. 1a, now comprises two force-field responsive layers, namely 3m', 3d' and 3m, 3d'' which are kept apart by a non-responsive or less responsive, layer 4b. The two layers 3m', 3d' and 3m'', 3d'' of course may be both magnetic or both dielectric, however one may be dielectric and the other magnetic. A protective layer such as layer 4' with or without an antihalation agent may be added to the laminate 2m, 2d at its base as called for.

While in some instances as well as in rigorous principle the lower of the two field-responsive layers, namely 3m'', 3d'' must be field-saturated before the upper one, namely 3m'', 3d' can respond, in practice the applied force-field is likely always to be sufficient even for n>2 such layers.

Those skilled in the art are well able to apply the Example of FIG. 1b to the cases of n>2. They are also well able to apply the disclosure relating to FIGS. 1a' and 1a'' to the embodiments comprising $3m' \ldots 3m^n$; $3d' \ldots 3d^n$ force-field responsive layers. Therefore repeated discussion of these cases is not necessary.

Figure 1C:
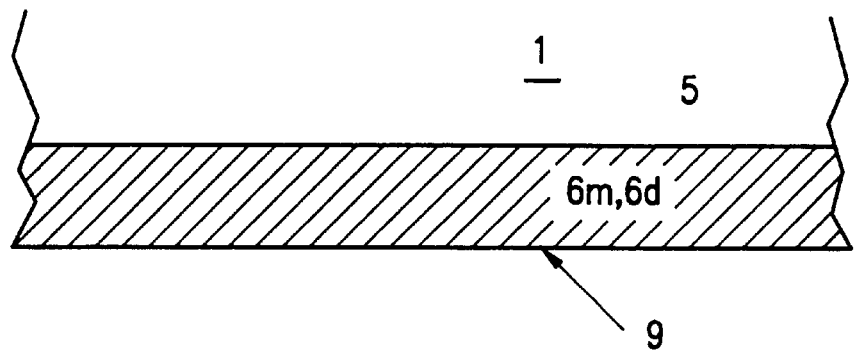

In another embodiment, shown in FIG. 1c, a matrix 6m/6d which holds a magnetic/dielectric powder is affixed to an otherwise conventional film 1 with support 5. In this example, the matrix 6m/6d by its very nature holds well dispersed magnetic/dielectric powder packed densely enough to be equivalent in mass, at least by the same order of magnitude, to the continuous, solid magnetic/dielectric layers 3m/3d discussed above. This matrix may be either exclusively magnetic or exclusively dielectric, however it may also be composed of both materials mixed in random or segregated form. Where desirable, matrix 6m/6d may be fitted with thin protective foils (not shown) at its top surface and its bottom surface 9, although preferably the surface 9 shall be smooth enough by itself to optically affect neither the base of the support 5 nor, in the stored-film condition, the top of the emulsion (not shown). This matrix 6m/6d also as a rule is thin compared to the film 1. In one variation this matrix 6m/6d is peelable from the otherwise conventional film 1 in the manner of the above described laminate 2m/2d of FIG. 1a. In another variation, however, the matrix 6 is soluble, in particular in water, or in another specific solvent, to allow its removal by dissolution before and/or during film-processing proper.

Although most of the above embodiments of FIGS. 1 through 1c were described in the context of magnetic materials, those skilled in the art will appreciate that the principles involved also apply in kindred manner to the electric force field embodiment.

Figure 1D:
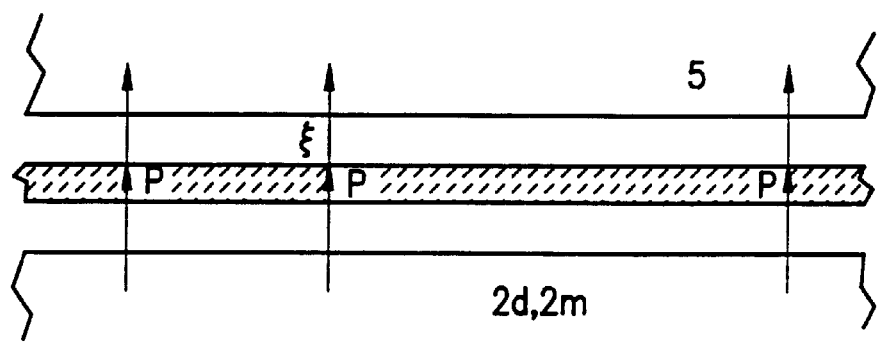
FIG. 1d is a vertical cross-section showing a film support and a laminate attracted to one another by means of a sandwiched polarized bonding layer.

FIG. 1d is a vertical cross-section of a bonding layer 4 sandwiched between a film support 5 and a laminate 2d, 2m. The bonding layer 4 is a dielectric hard-polarized at a value P generating a field $\xi$ in each gap about said layer 4 (and displacement vectors D and D' in said support and laminate resp.). The fields in each gap generate the desired attractions. Following film exposure, both the laminate 2d, 2m and the bonding layer 4 can be removed from the support 5 by peeling.

FIGS. 2a through 3.b1 show the assemblies of the invention, with the force-field responsive sub-assemblies, already discussed above in relation to FIGS. 1a through 1c, where occurring at all, merely being symbolically indicated for comprehensibility, the emphasis in said FIGS. 2a–3.b1 bearing on the other sub-assemblies of the invention, namely the force-field generating units.

These first and second sub-assemblies of the invention are shown, or assumed, in FIGS. 2a through 2a.3 (furthermore in other drawings yet to be discussed) being separated from the reference surface 8s by a gap h due to a warp in the (unattracted) film. The gap h is shown uniform for simplicity of elucidation and because such simplicity does not affect the objects of discussion.

FIG. 2a shows a pressure plate 8d which at the same time is the dielectric force-field generating unit 7d, located a gap h which it shall reduce so that the conventional film support 5 will come to rest against the reference surface 8s. The direction of polarization P is shown perpendicular to the support 5, and so is the electric displacement vector $\xi$. The expert understands that other directions of polarization, and hence of the displacement vector $\xi$ are possible, in particular with the polarization P parallel to the plane of the support 5. In this embodiment, the conventional film is unaltered, that is, the force-field responsive laminate 2d, 2m used elsewhere is omitted here, and the attraction is implemented in cooperation with the dielectric support 5.

FIG. 2a.1 a reference surface means with a reference surface 8s and composed of two force-field generating plates 7d and 7m, 7d being polarized as indicated and generating a displacement vector $\xi$ and 7m being magnetized as indicated and generating a induction vector B as shown. If desired the plates 7d and 7m may be separated by a slight gap, moreover the directions of polarization and magnetization can be altered. In this instance the embodiment is shown with a conventional film support 5 being fitted with a magnetically responsive layer 3m: the purpose of such a dual force-field generating unit 7d, 7m is universality, that is, the ability to attract a film regardless of this film being unaltered or only comprising a magnetically responsive layer 3m. Obviously too, such a dual force-field generating unit 7d, 7m also will attract a conventional fitted with a dual laminate of the invention, that is a laminate comprising both electrically and magnetically responsive layers.

In FIG. 2a.2, a number of hard-polarized dielectric/ferroelectric force-field generating elements 70d, of which only two are shown, are mounted to the bottom of the pressure plate 8 (illustrated in cross-section as strips 70d running by their lengths transversely to the direction of film advance R and are spaced apart between their adjacent poles, here shown of opposite signs, by a distance D large enough that the electric fluxes $\xi$ from the mutually facing (+) and (–) poles across this gap D link only slightly with each other while being each substantially shunted by the layer 3d, which may also be construed as the support 5 of an unaltered conventional film, and thus they substantially close each one on its own dipole. Because the warp gap h<<D, the individual hard-magnetic strips can be positioned relatively close together, and if there are N such hard-polarized strips, the attraction per unit area will be due to N sets of ± poles, plus the attraction due to local "leakage" from the strip, instead of being due to the single set of ± poles (plus leakage) of FIG. 2a. Therefore the attraction will be larger than produced by a single strip 70m the size of the pressure plate 8d of the embodiment of FIG. 2a.1. In a variation of the embodiment of FIG. 2a.2 not shown in the drawings, the adjacent poles of the hard-polarized strips 70d are of the same polarity and the gap D may thereby be made smaller yet.

In a variation, the spaced strips 70d, instead of running transversely to the direction of advance R, will be running parallel to it or in any direction subtending an angle between 0 and 90° with the direction of advance R.

In another variation, not shown, the strips 70d of FIG. 2a.2 are hard-polarized in either of the two directions perpendicular to the film plane, that is, either up or down.

In another embodiment of the invention shown in FIG. 2a.3, the dielectric embodiment of FIG. 2a.2 is combined with magnetic force-field generating elements 70m and with a magnetic force-field responsive layer 3m, in this instance the directions of polarization and magnetization being arbitrarily shown perpendicular to the direction of advance R, the electric and magnetic force-field generating elements 70d and 70m resp. alternating, and the magnetic force-field responsive layer 3m being shown above the electric force-field responsive layer 3d. As shown, the two layers 3d and 3m form at least part of the laminate 2 itself affixed to an omitted conventional film substrate.

It is clear to the expert that the embodiment of FIG. 2a.3 is to be construed symbolically, that the directions of polarization P and magnetization M may be changed, that the configuration of the laminate 2 may be altered, for instance being made into alternating strips or other configurations as already shown in FIGS. 1a.1 through 1a.4 and 1.b, and moreover that all such combinations and variations are applicable also to the embodiments of FIGS. 2a and 2a.1 and therefore need not be elucidated further.

It is furthermore clear per se that the force-field generating unity shown in FIG. 2a.3 consisting of alternating dielectric and magnetic generating elements 70d and 70m is also universal in that it will attract other combinations of force-field responsive layers than shown in this figure, for instance that it will also attract, and hence flatten an unaltered, conventional film by this film's support 5 (omitted from FIG. 2a.3).

While the above second, active sub-assemblies of the invention in the form of said force-field generating units 7m, 70m were illustrated as being integrated into the pressure plate itself or being elements affixed to it, they also may be mounted elsewhere, for instance to the camera back cover, provided they remain near enough the laminate 2m.

FIG. 3a shows an embodiment of a sub-assembly of the invention in which the film support 5 is immersed in and attracted by the electric field from a force-field generating unit situated a warp-distance h below in the unenergized case and which in this instance is a pair of coplanar, electrically conducting strips 70c running into the plane of the drawing and separated in their plane by a non-conducting gap D. One strip 70c is connected to the positive terminal of a DC power source and the other strip 70c to the negative terminal. For clarity the lower field lines were omitted from FIG. 3a. The strips 70c are affixed in the vicinity of, near or in the film reference surface (not shown in this figure), which of course must be electrically non conductive or insulated from the strips 70c.

FIG. 3a.1 shows an embodiment kindred to that of FIG. 3a but illustratively with 4 strips 70c, which are alternatingly connected to the same terminal of a power source, and selectively to DC or AC through a switch SW when energized. The field lines between the strips are then as indicated by the dashed lines (the lower field lines being omitted for clarity). It is clear per se that the strips 70c may be a total of N, with N/2 alternating strips 70c in parallel and connected to one terminal, and the remaining alternating N/2 strips also in parallel and connected to the other terminal of either source when energized, and hence that N preferably shall be even. Be it noted that AC operation is possible deep into the ultrasonic range.

It should be understood by those skilled in the art that in all of the above-discussed embodiments of the laminates of the invention, the laminates are affixed to the otherwise conventional film during exposure and are subsequently removed, before or during processing, to allow printing.

B.1 Sheetfilm-camera Assemblies of the First Objective of the Invention

In variations of the preferred embodiments described above relating to the rollfilm-camera assemblies, the principles of the embodiments shown in FIGS. 1 through 3a.1 also apply to sheetfilm camera assemblies.

In the following discussion of sheetfilm and sheetfilm holders, Roman numerals are used both for the Figure and for the component references to emphasize the distinction relative to rollfilm embodiments.

FIG. 4 is a vertical and schematic cutaway cross-section of a conventional sheetfilm-holder C loaded with film I on both sides. The (unreferenced) peripheral guides are only indicated at the top and bottom as holding the warped sheetfilm, of which the detachment from the partition VIII is much exaggerated. The significance of the sheetfilm-holder width "e" arises from the incremental film thickness caused by the additional force-field responsive laminate of the invention, and will be briefly considered further below.

Figure 4B:
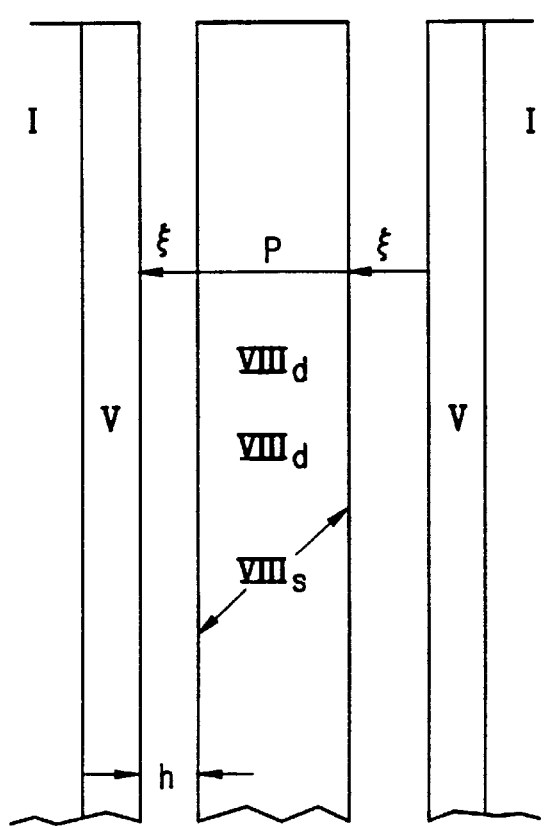
Figure 4A:
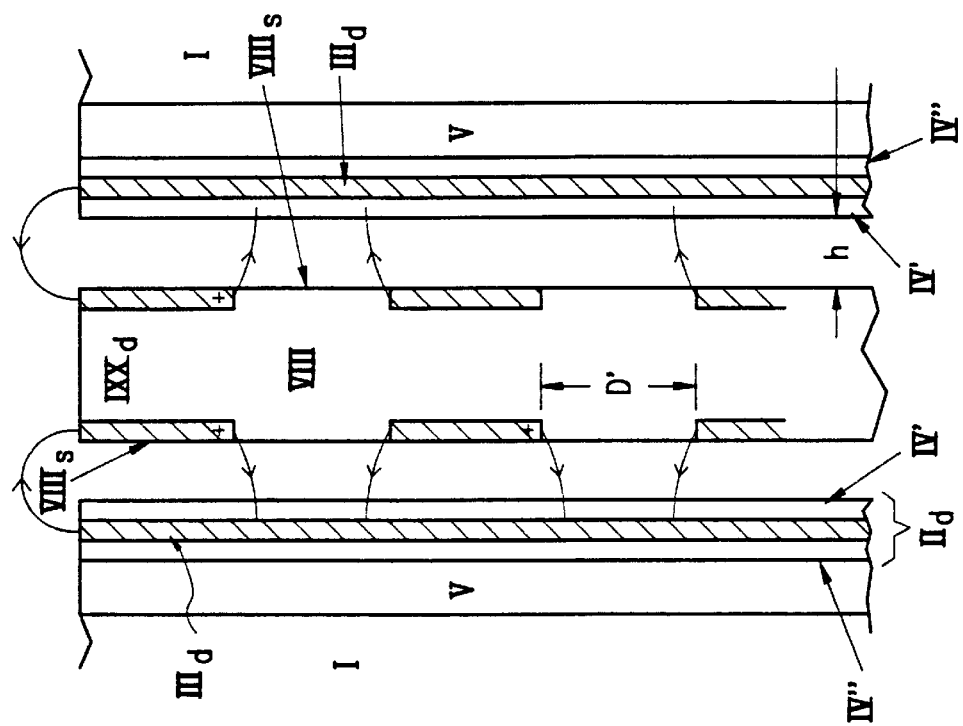
Figure 4A:
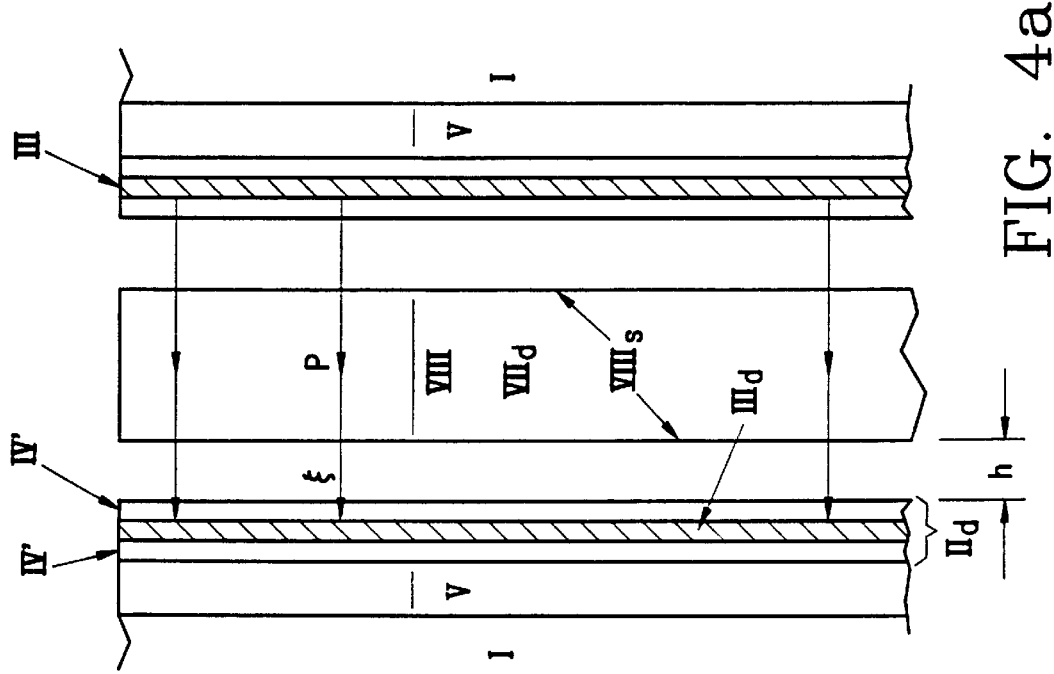

FIG. 4a is another vertical cross-section schematically showing a cutaway of the second sub-assembly of the invention composed of the force-field generating unit, in this instance the partition VIII of a sheetfilm holder loaded left and right with sheetfilm I each comprising the first force-field responsive sub-assembly of the invention. In this embodiment the partition VIII itself is the permanent ferroelectric/dielectric VIId which is polarized, as indicated by P and which generates the displacement vector $\xi$ perpendicular to the plane of the film I, of which the support V in turn is fitted with the said force-field responsive sub-assembly of the invention, i.e. The multi-layer dielectric laminate IId. Both sheetfilms I therefore will be attracted against the reference surface VIIIs. Except for the electric force-field generating-unit/sheetfilm-holder C now polarizing two films instead of one, the same considerations that were raised in relation to FIG. 2a concerning rollfilms apply to this embodiment, including the possibility of AC operation. The layer IV" may be the bonding layer per se or it may be a bonding layer combined with an antihalation layer. Preferably the optional layer IV is made of a low-friction material such as Teflon™. The field-responsive layers are denoted by IVd' and the warp gap is symbolically denoted by h.

FIG. 4a.1 cross-sectionally shows another illustrative embodiment of a sheetfilm-holder partition VIII representing the second force-field generating sub-assembly wherein permanently-polarized dielectric/ferroelectric elements, i.e., strips LXXd, which are polarized parallel to the partition VIII, are imbedded symmetrically and with the same polarities on each side of partition VIII and a distance D' apart on each surface VIIIs which is substantially larger than the distance from a pole to the dielectric film layer IVd of the invention. The multi-layer dielectric film laminate IId representing the first, force-field responsive sub-assembly is composed in this instance of an optional protective layer IV', of the field-responsive layer IVd and of a bonding/antihalation layer IV". Aside the particular geometry of the sheetfilm-holder partition, the same principles apply here as to the embodiment of FIG. 2b, including the possibility of AC operation.

In a variation of the preceding embodiment, the polarized-dielectric/ferroelectric strips LXXd at each surface of FIG. 4a.1 may be arranged adjoining by their poles of the same polarity but not touching each other. Furthermore, the polarized dielectric/ferroelectric strips LXXd shown in FIG. 4a.1 may be mounted on the surface of the smooth partition serving as the reference-surface means, instead of being imbedded in it, in which event however the gaps D' between them, if comparably large, for instance if more than a few mm, must be filled-up to provide a sufficiently smooth and sustaining reference surface. The layer IV" again may be a mere bonding layer or it may be combined with an antihalation agent. Those skilled in the art should note that the elements LXXm are shown symbolically and may assume other geometric shapes or even be randomly shaped, and that the gaps D' then shall commensurately match the particular elements.

In a variation (not shown) of the embodiment of FIG. 4a.1, the strips LXXd are polarized in reinforcing directions perpendicularly to the plane of the partition VIII.

FIG. 4a.2 is a cross-sectional cutaway of another embodiment of the assembly of the invention in the form of a different sheetfilm-holder. In this embodiment the sheetfilm I also comprises a force-field responsive sub-assembly in the form of an affixed laminate IIm of the invention and of the kind already discussed above. But the second sub-assembly comprising the force-field generating unit, instead of being integrated into the partition VIII, now is embodied in each film-mask X. In FIG. 4c, one film-mask X is shown on the left, whereas the other, belonging to the right side, was removed for picture taking. During this exposure, the films are attracted in the manner indicated, namely film I on the right of the partition VIII, while being exposed, is flattened against its reference surface VIIIs by the polarized film-mask X on the left. Said film mask X further acts on, and also pulls the light-protected film I on the left, which thereby buckles as indicated, but only when it is the film which is AWAY from the lens. Whichever film faces the lens will be flattened against the reference surface VIIIs as shown. In some instances, however, remanence in said laminates might become bothersome when picture taking. To obviate such an eventuality, the invention takes further steps:

In order to always secure the proper and mutual direction of polarization of FIG. 4a.3, as assumed being the case just before the exposure of the film $I_b$, the invention calls not only for the film-masks X per se being magnetized in the proper directions, for instance, in the case of FIG. 4d, inwardly for film-mask $X_a$ and outwardly for film-mask $X_b$, but furthermore that they be each mutually keyed, for instance mechanically, with their sheetfilm holder for insertion into latter in such manner that all the polarities indicated in FIG. 4d', which is assumed the case after said exposure of film $I_b$ and now being the exposure of film $I_a$, will always be automatically observed. In addition, it is preferred that the film-masks X be coated on their film-facing sides with a thin, low-friction film.

FIG. 4b shows an embodiment wherein the partition VIIId acting as the reference surface means and simultaneously being the force-field generator in the form of a hard polarized dielectric/ferroelectric with polarization P produces an electric displacement vector ξ which attracts the conventional support V of a conventional sheetfilm on either side (and will reduce the gap h, here shown exaggerated, to actual and virtual contact once attraction has been effected). This embodiment 4b for the case of sheetfilm corresponds to the embodiment of FIG. 3a for rollfilm and again represents substantial simplification because the conventional sheetfilm need not be modified.

B.2 Focusing Means of the Second Objective of the Invention

FIG. 5 shows, on the right hand side, an arrow A symbolizing the picture to be taken (which may be at infinity), to the left of it a conventional view camera C (here a field camera) symbolically shown in sideview having a lens 1, a lens-holding frame ("standard") 2 resting on a base 4 along which said standard is displaceable by means of an omitted slide mounted in said frame, a bellows 3 connected in light-tight manner both to the standard 2 and to a first frame 5 evincing a recess 8 which is to receive one side of a sheetfilm holder such as H shown on the left, and a second frame, also called "back" 6, fitted with a conventional glass or equivalent focusing screen 7 having a ground-glass (or equivalent) focusing surface GG1 inside a recess 8' matching the recess 8 and enclosing the other side of the sheetfilm holder when inserted. The sheetfilm holder H is shown symbolically, with the mask assumed removed, and the loaded sheetfilm is denoted by the oblique lines. When the camera is not loaded with film, the second frame 6 rests against the first frame 5, usually by spring loading, and will be moved back only when the sheetfilm holder is inserted for picture taking. Herein D is construed being the distance between an idealized thin lens replacing the actual lens 1 and the focusing surface GG1.

FIG. 5a.1 shows, on an enlarged scale, a portion of the conventional camera C of FIG. 5, namely, at the top, the first and second frames 5 and 6 at the time focus has been established, the ground-glass surface GG1 or equivalent being the required focusing distance D between the plane V1 through the idealized, substituted thin lens 1 and said surface GG1, and at the bottom a symbolic cross-section of the sheetfilm holder H, this cross-section being in the same plane as shown for the frames 5 and 6 of FIG. 5. For simplicity the second sheetfilm that would be typically also present was omitted. The top of FIG. 5a.1 again shows a conventional, glass or other focusing screen 7 with a focusing surface GG1 and affixed practically permanently to the second frame 6.

Ideally the focusing surface GG1 of the ground-glass or other screen 7 at the top of FIG. 5a.1 should be in the same plane V2 as subsequently occupied by the planar emulsion of the sheetfilm 11 in the sheetfilm holder H at the bottom of FIG. 5a.1. In other words, the conventional permanent focusing screen 7 should be positioned in such manner in the recess 8' of the frame 6 that its focusing surface GG1 is in a geometrical plane V1 which also passes through the planar emulsion surface to be exposed of the sheetfilm 11 after the sheetfilm holder H has been inserted into the recesses 8 and 8' for picture taking. However, as indicated in grossly exaggerated manner for clarity of exposition by the position of the plane V1 in the lower part of FIG. 5a.1, this is doubtful on several accounts, namely that installation tolerances may exceed the already mentioned desirable limit of 50 microns, or the screen after extended use may have been poorly replaced by another, or that the separation of the frames 5 and 6 as indicated by the slight gap between them in the upper part of FIG. 5a.1 may have changed with time; moreover, the single position assumed by the conventional screen 7 in the recess, 8' can rigorously correspond only to one sheetfilm thickness when in fact the thicknesses of sheetfilms are spread over a range which is comparable and larger than said 50 microns value.

The invention, on the other hand, substitutes a quickly and easily insertable/removable focusing frame 12 fitted with a focusing screen GG2 (FIG. 5a.2) and thereby allows closely matching the plane of said focusing surface GG2 to the subsequent position of the planar emulsion of a sheetfilm of a given thickness to be exposed. Thus the focusing frame 12 of the invention assumes a shape and dimensions which, with one exception cited further below, always shall be externally precisely congruent with those of the conventional sheetfilm holder H being used for the camera, wherein the structural member 13, which is the viewing screen, replaces the partition 10 of the conventional holder H. It follows that the position of the focusing surface GG2 of the focusing frame 12 in no way depends on the frame 6 as does the conventional focusing surface and that accordingly all the problems previously cited and relating to a focusing screen mounted in the second frame 6 have been eliminated. Furthermore, to take into account different film thicknesses, which the conventional focusing screen does not, the focusing surface GG2 of the invention, and thereby the focusing screen 13, will be shifted as needed to the left or to the right (to the right in FIG. 5a.2) of the position occupied by the surface of the partition 10 supporting the film 11 (bottom of FIG. 5a.1) by an amount Δt(hickness) corresponding to a given sheetfilm thickness differential from a mean value of said range of thicknesses. In this manner several focusing frames may be offered to the photographer, each for a given sheetfilm thickness. Alternatively, if the range of applicable thicknesses is fairly narrow, a screen 13 matching such a mean thickness may be used.

Note should be taken that the unreferenced U-shaped guides of the reference frame 12 at the top and bottom of FIG. 5a.2 need not necessarily project beyond the screen 13 as much as they do on the left side of the screen 13, or at all, since the second frame 6 can be expected to press (by means not shown) the frame 12 anyway into the recess 8 of the first frame 5 of the camera of FIG. 5.

Moreover, the focusing frame 12 of the invention may be polarized (mechanically) by means well known to the expert in order that it can be inserted only when the focusing screen GG2 faces the lens 1.

Lastly a single focusing frame of the invention, precisely matching a given film thickness, may be employed, the other sheetfilm thickness being corrected-for using a vernier means mounted in said base 4 for instance. Such a vernier is also advantageous in other respects which however are outside the scope of this invention and therefore are not discussed herein.

DESIGN CRITERIA

Sheetfilm thicknesses of US products usually run from approximately 5 to 8 mils (1 mil=0.001 inch=25 microns). Using a mean of 6½ mils as the value for which to design the focusing screen 13 of the invention would thus entail a theoretical "degradation" of ±1½ mils=37.5 microns from the ideal position, an error probably acceptable within the above cited 50 microns range, especially if the sheetfilm is not flattened in the manner of the invention as discussed further above. Where however such flattening is resorted to, and sharpness commensurately increased and thereby also more sensitive to other degradations, either focusing frames of the invention each designed precisely for a given sheet-film thickness are preferable, or a "universal" focusing frame designed for a single, given sheetfilm thickness, other sheetfilm thicknesses being corrected by vernier means, may be used.

Having thus described preferred embodiments of the invention in sufficient detail to enable one skilled in the art to make and use the invention, it is to be understood furthermore that no portion of the specification or drawings is to be construed as limiting, and that the invention is intended to encompass all variations of the preferred embodiments. Consequently, it is intended by the inventor that the invention be limited solely by the appended claims.

I claim:

1. A method for quickly and reliably focusing a lens-equipped large-format camera from which the conventional viewing screen has been eliminated and fitted with a recess for receiving a conventional partition-fitted sheet film holder optionally loaded with sheetfilm(s) evincing an emulsion surface, whereby said recess initially receives a focusing frame congruent as a whole or in part with the conventional sheetfilm holder and containing a transparent focusing screen optionally exactly congruent with the conventional sheetfilm holder partition and having a focusing surface facing the lens, and focusing is carried out at said focusing surface to determine and affix a particular plane of focus in the camera, whereupon said focusing frame with its focusing screen is withdrawn from said recess, and said sheetfilm holder, holding at least one sheetfilm with emulsion to be exposed, is inserted into said recess for picture-taking, the location of said focusing frame's focusing screen relative to said sheetfilm holder's partition having been so designed that, within a predetermined tolerance, including zero tolerance, the emulsion surface of the sheetfilm in the inserted sheetfilm holder shall coincide with said determined and affixed plane of focus.

2. A focusing frame to implement the method of claim 1, wherein the focusing film frame has a length, height and breadth, for a lens-fitted large-format camera accepting an optionally film-loaded conventional sheetfilm holder comprising both an opaque partition and two identical film-guiding/retaining frameworks one on each side of the partition for each sheetfilm, this sheetfilm-holder furthermore having length, height and breadth, where its height and length resp. correspond to the smaller and larger dimensions of the (rectangular) sheetfilm, said focusing frame comprising a focusing screen with a focusing surface, supplanting the camera's conventional fixed viewing screen, being inserted into the camera before and in the very place of the loaded sheetfilm holder to adjust and affix the focus at its focusing surface and then being withdrawn from the camera to be subsequently replaced by said loaded sheetfilm holder, where said focusing frame is externally geometrically congruent both in its breadth and in its height with the breadth and height of the conventional sheetfilm holder and its length is at least approximately the same as the length of the conventional sheetfilm holder, but the opaque partition of the conventional sheetfilm holder is replaced in the focusing frame of the invention by a transparent focusing screen of which the height and length are approximately the same as or optionally larger than the height and the length of the sheetfilm and of which the focusing surface is exactly in the plane of the conventional sheetfilm-holder partition facing the lens when said holder is inserted in the camera.

3. A focusing frame as claimed in 2, wherein the focusing frame has a focusing surface which coincides with the plane of the emulsion of a sheetfilm of a specific thickness.

4. A focusing frame according to claim 1, wherein the focusing frame having a length, height and breadth, for a lens-fitted large-format camera accepting a conventional sheetfilm holder comprising both an opaque partition and two identical film-guiding/retaining frameworks one on each side of the partition for each sheetfilm, and optionally loaded with sheetfilm selected from a group of sheetfilms of different thicknesses, this sheetfilm-holder furthermore having length, height and breadth, where its length and height resp. correspond to the larger and smaller dimensions of the (rectangular) sheetfilm, said focusing frame comprising a focusing screen with a focusing surface, supplanting the camera's conventional fixed viewing screen, being inserted into the camera before and in the very place of the loaded sheetfilm holder to adjust and affix the focus at its focusing surface and then being withdrawn from the camera to be subsequently replaced by said loaded sheetfilm holder, where the lens-facing focusing surface of the focusing-frame inserted into the camera is positioned, in the breadth-direction of the focusing frame, within this breadth, at one selected position within the positions assumed by the emulsions of a sheetfilm respectively 0.05 mm thick and 0.35 mm thick when at the lens-facing side of a conventional sheetfilm holder inserted into the camera.

5. A focusing frame according to claim 4 wherein the focusing frame has a focusing surface which coincides with the plane of the emulsion of a sheetfilm 0.15 mm thick.

6. A focusing frame according to claim 2 wherein the focusing frame for a lens-fitted view camera is fitted with a conventional sheetfilm-holder recess also accepting the focusing frame, and where said recess and the focusing frame are mutually keyed in such manner that focusing-frame insertion is allowed only when the focusing screen's focusing surface faces the lens.

7. A focusing frame according to claim 3 wherein the focusing frame for a lens-fitted view camera is fitted with a conventional sheetfilm-holder recess also accepting the focusing frame, and where said recess and the focusing frame are mutually keyed in such manner that focusing-frame insertion is allowed only when the focusing screen's focusing surface faces the lens.

8. A focusing frame according to claim 4 wherein the focusing frame for a lens-fitted view camera is fitted with a conventional sheetfilm-holder recess also accepting the focusing frame, and where said recess and the focusing frame are mutually keyed in such manner that focusing-frame insertion is allowed only when the focusing screen's focusing surface faces the lens.

9. A focusing frame according to claim 5 wherein the focusing frame for a lens-fitted view camera is fitted with a conventional sheetfilm-holder recess also accepting the focusing frame, and where said recess and the focusing frame are mutually keyed in such manner that focusing-frame insertion is allowed only when the focusing screen's focusing surface faces the lens.

10. A focusing frame to implement the method of claim 1 wherein the focusing frame has a length, height and breadth, for a lens-fitted large-format camera accepting a conventional sheetfilm holder comprising both an opaque partition and two identical film-guiding/retaining frameworks one on each side of the partition for each sheetfilm, and loaded with sheetfilm selected from a group of sheetfilms of different thicknesses, this sheetfilm-holder furthermore having length, height and breadth, where its length and height resp. correspond to the larger and smaller dimensions of the (rectangular) sheetfilm, where the height and length of the focusing frame are resp. identical and at least approximately the same as the height and length of the conventional sheetfilm holder, but the breadth of the focusing frame is reduced at its side away from the lens by at least approximately the thickness of one of the conventional sheetfilm-holder's two identical film guiding/retaining frameworks.

\* \* \* \* \*